US012812596B2

(12) United States Patent
Hong et al.

(10) Patent No.: US 12,812,596 B2
(45) Date of Patent: Nov. 24, 2026

(54) INFORMATION SENDING METHOD, PAGING RESTRICTION METHOD, AND COMMUNICATION APPARATUS

(71) Applicant: Beijing Xiaomi Mobile Software Co., Ltd., Beijing (CN)

(72) Inventors: Wei Hong, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 269 days.

(21) Appl. No.: 18/577,731

(22) PCT Filed: Jul. 9, 2021

(86) PCT No.: PCT/CN2021/105585
§ 371 (c)(1),
(2) Date: Jan. 9, 2024

(87) PCT Pub. No.: WO2023/279393
PCT Pub. Date: Jan. 12, 2023

(65) Prior Publication Data
US 2024/0334392 A1 Oct. 3, 2024

(51) Int. Cl.
*H04W 68/02* (2009.01)
*H04W 88/06* (2009.01)

(52) U.S. Cl.
CPC ............ *H04W 68/02* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2011/0122859 | A1* | 5/2011 | Song ..................... | H04W 68/00 370/338 |
| 2016/0029343 | A1 | 1/2016 | Quan et al. | |
| 2018/0249349 | A1* | 8/2018 | Hu ........................ | H04W 88/06 |
| 2019/0007992 | A1 | 1/2019 | Kim et al. | |
| 2020/0037380 | A1 | 1/2020 | Qiu et al. | |
| 2021/0329483 | A1* | 10/2021 | Wu ....................... | H04W 24/08 |
| 2021/0345292 | A1 | 11/2021 | Bao et al. | |

FOREIGN PATENT DOCUMENTS

| | | | |
|---|---|---|---|
| CN | 104994487 | A | 10/2015 |
| CN | 107466022 | A | 12/2017 |
| CN | 107623900 | A | 1/2018 |
| CN | 110351704 | A | 10/2019 |
| CN | 111278106 | A | 6/2020 |
| CN | 112788745 | A | 5/2021 |
| EP | 4351239 | A1 | 4/2024 |

(Continued)

OTHER PUBLICATIONS

ISA State Intellectual Property Office of the People's Republic of China, International Search Report issued in Application No. PCT/CN2021/105585, Mar. 24, 2022, WIPO, 7 pages.

(Continued)

*Primary Examiner* — Frantz Bataille
(74) *Attorney, Agent, or Firm* — Finnegan, Henderson, Farabow, Garrett & Dunner, L.L.P.

(57) ABSTRACT

An information sending method is performed by a terminal, and includes: sending paging restriction information to a network-side device, wherein the paging restriction information is configured for indicating conditions under which the network-side device restricts paging for the terminal.

18 Claims, 4 Drawing Sheets

(56) References Cited

FOREIGN PATENT DOCUMENTS

| | | | |
|---|---|---|---|
| GB | 2587489 | A | 3/2021 |
| WO | 2020243943 | A1 | 12/2020 |

OTHER PUBLICATIONS

Vodafone,"Function Description for Multi-USIM devices—TAU rate limit", 3GPP TSG-SA2 Meeting # 144E (e-meeting) S2-2102897, Elbonia, Apr. 6, 2021, 3 pages.

State Intellectual Property Office of the People's Republic of China, Notice of Allowance issued in Application No. 202180002015X , Jun. 21, 2023, 7 pages.

State Intellectual Property Office of the People's Republic of China, The First Office Action and Search Report issued in Application No. 202180002015X, Jul. 5, 2022, 15 pages.

State Intellectual Property Office of the People's Republic of China, The Second Office Action and Search Report issued in Application No. 202180002015X, Mar. 31, 2023, 11 pages.

Extended European Search Report issued by the European Patent Office on Mar. 21, 2025, in corresponding Application No. EP 21948887.1, 8 pages.

"Using Service Request procedure for coordinated leaving and BUSY indication in EPS for a Multi-USIM mode UE", Nokia, Nokia Shanghai Bell, 3GPP TSG-CT WG1 Meeting #129-e, C1-212180, Electronic meeting, Apr. 19-23, 2021, 11 pages.

ISA State Intellectual Property Office of the People's Republic of China, Written Opinion of the International Searching Authority Issued in Application No. PCT/CN2021/105585, Mar. 24, 2022, WIPO, 7 pages.

Intellectual property India, Hearing Notice in Application No. 202417007758, Jul. 17, 2026, 4 pages.

* cited by examiner

INFORMATION SENDING METHOD, PAGING RESTRICTION METHOD, AND COMMUNICATION APPARATUS

CROSS REFERENCE TO RELATED APPLICATIONS

The present application is a U.S. National Stage of International Application No. PCT/CN2021/105585 filed on Jul. 9, 2021, the content of which is incorporated herein by reference in its entirety.

TECHNICAL FIELD

The present disclosure relates to the field of communication technology, and more specifically, to an information sending method, a paging restriction method and a communication apparatus.

BACKGROUND

With the development of communication technology, there are more and more types of user equipment, and different types of user equipment may have different tendencies towards service requirements.

In order to communicate for a certain service, it is generally necessary for the base station to page the user equipment first. However, the user equipment may not want to receive the paging in some cases. For example, if the user equipment expects to carry out the type A service, but the base station sends the paging for the type B service to the user equipment, the user equipment may not respond to the paging. In this case, the base station paging the user equipment not only wastes the resources of the base station but also affects the communication of the user equipment.

SUMMARY

In view of this, embodiments of the present disclosure propose an information sending method, a paging restriction method, an information sending apparatus, a paging restriction apparatus, a communication apparatus, and a computer-readable storage medium to solve technical problems in the related art.

According to a first aspect of embodiments of the present disclosure, an information sending method is performed by a terminal, the method including: sending paging restriction information to a network-side device, where the paging restriction information is configured for indicating conditions under which the network-side device restricts paging for the terminal.

According to a second aspect of embodiments of the present disclosure, a paging restriction method is performed by a network-side device, the method including: receiving a paging restriction information sent by a terminal, where the paging restriction information is configured for indicating conditions under which the network-side device restricts paging for the terminal.

According to a third aspect of embodiments of the present disclosure, a communication apparatus includes: a processor; and a storage for storing computer programs; where the processor is configured to: send paging restriction information to a network-side device, where the paging restriction information is for indicating conditions under which the network-side device restricts paging for a terminal.

BRIEF DESCRIPTION OF DRAWINGS

The accompanying drawings of the present disclosure will be briefly introduced below. Obviously, the accompanying drawings in the following description are only some of the embodiments of the present disclosure. For a person of ordinary skill in the field, other embodiments can be obtained.

DETAILED DESCRIPTION

The technical solutions in the embodiments of the present disclosure will be described clearly and completely in the following in conjunction with the accompanying drawings in the embodiments of the present disclosure. Obviously, the described embodiments are only a part of the embodiments of the present disclosure, and not all of the embodiments. Based on the embodiments in the present disclosure, all other embodiments obtained by a person of ordinary skill in the art without making creative efforts fall within the scope of protection of the present disclosure.

Terms used in the present disclosure are used solely for the purpose of describing particular embodiments and are not intended to limit the present disclosure. The singular forms "a" and "the" as used in the present disclosure and the appended claims are also intended to encompass the plural forms, unless the context clearly indicates otherwise. It should also be understood that the term "and/or" as used herein refers to and encompasses any or all possible combinations of one or more associated listed items.

It should be understood that while the terms first, second, third, etc. may be employed in embodiments of the present disclosure to describe various types of information, such information should not be limited to these terms. These terms are only for distinguishing the same type of information from one another. For example, without departing from the scope of embodiments of the present disclosure, first information may also be referred to as second information, and similarly, second information may be referred to as first information. Depending on the context, as used herein, the phrase "if" may be interpreted as "at . . . ", "when . . . " or "in response to determining".

For the purposes of brevity and ease of understanding, the terms "greater than" or "less than", "higher than" or "lower than" are used herein to describe size relationships. However, for those skilled in the art, it is understood that the term "greater than" also covers the meaning of "greater than or equal to", the term "less than" also covers the meaning of "less than or equal to"; the term "higher than" also covers the meaning of "higher than or equal to", the term "lower than" also covers the meaning of "lower than or equal to".

Figure 1:
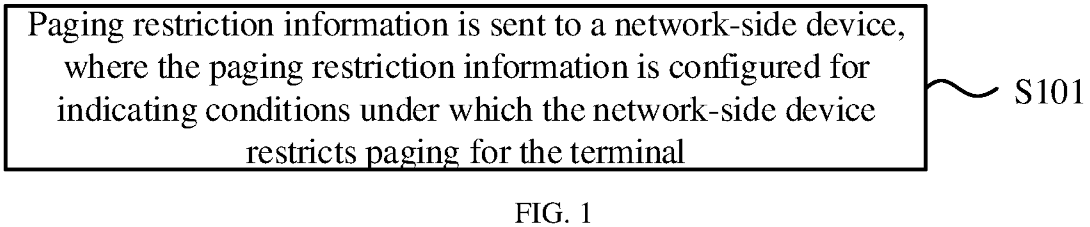
FIG. 1 is a schematic flowchart of an information sending method illustrated according to embodiments of the present disclosure.

FIG. 1 is a schematic flowchart of an information sending method illustrated according to embodiments of the present disclosure. The information sending method illustrated in this embodiment may be performed by a terminal. The terminal includes but is not limited to a cell phone, a tablet, a wearable device, a sensor, an IoT device, and other communication devices. The terminal, as user equipment, may communicate with a network-side device. The network-side device includes but is not limited to a base station and a core network. The base station and the core network include but are not limited to a base station and a core network in a communication system such as 4G, 5G, 6G communication system, and the like.

As shown in FIG. 1, the information sending method includes step S101.

In step S101, paging restriction information is sent to a network-side device, where the paging restriction information is configured for indicating conditions under which the network-side device restricts paging for the terminal.

In one embodiment, the terminal may determine its own tendency for the paging, such as allowing the reception of paging for a target type of service and disallowing the reception of paging for other types of services. Further, paging restriction information can be generated according to the paging tendency. The paging restriction information can be sent to the network-side device, so that the network-side device can determine the conditions of restricting paging for the terminal according to the paging restriction information. In this way, when requiring to page a terminal, the base station can determine whether or not to page the terminal according to the conditions, thereby avoiding unnecessary paging, so as to avoid wasting the resources of the network-side device, and to avoid affecting the communication of the terminal.

In one embodiment, the terminal may be a single-SIM terminal or a multi-SIM terminal.

In the case where the terminal is a single-SIM terminal, a SIM is provided in the terminal, and paging restriction information may be configured for indicating conditions under which the network-side device restricts paging for this SIM.

In the case where the terminal is a multi-SIM terminal, a plurality of SIMs are provided in the terminal, and the paging restriction information may be configured for indicating conditions under which the network-side device restricts paging for at least one of the SIMS, for example, for indicating respective conditions under which the network-side device restricts paging for each corresponding SIM.

Take a first SIM and a second SIM in the plurality of SIMs as an example. The first SIM and the second SIM are not specifically referred to two certain SIMs, but generally referred to any two different SIMs in the plurality of SIMs. The first SIM and the second SIM may belong to the network(s) provided by the same operators or may belong to different networks respectively provided by different operators.

The paging restriction information may be configured for indicating a condition 1 under which the network-side device restricts paging for the first SIM and a condition 2 under which the network-side device restricts paging for the second SIM. The condition 1 and the condition 2 may be the same or may be different, as may be set as desired.

In one embodiment, for a multi-SIM terminal, when the terminal is communicating with a network-side device through a SIM, it may send paging restriction information to the network-side device via the SIM, the paging restriction information being configured for indicating conditions under which the network-side device restricts paging for other unused SIMs.

For example, still take the first SIM and the second SIM as an example. The terminal is communicating with the network-side device through the first SIM, and may send paging restriction information to the network-side device via the first SIM, the paging restriction information being configured for indicating conditions under which the network-side device restricts paging for the second SIM.

Accordingly, when needing to page the second SIM, the network-side device may first determine whether the conditions are satisfied. For example, if the conditions include restricting paging for other types of services other than the target type of service, the network-side device may page the second SIM only when needing to initiate the target type of service for the second SIM, and it is unnecessary to page the second SIM when initiating other types of services for the second SIM.

It should be noted that in this case, if the network-side device A which pages the first SIM and the network-side device B which pages the second SIM are different network-side devices, after the first SIM sending the paging restriction information to the network-side device A, the paging restriction information may be sent by the network-side device A to the network-side device B, so that the network-side device B can determine the conditions of restricting paging for the second SIM.

On the one hand, the network-side device paging the second SIM consumes resources of the network-side device. On the other hand, after receiving the paging for the second SIM, the terminal also needs to determine whether to interrupt the communication of the first SIM and respond to the paging for the second SIM, which may affect the communication of the terminal.

According to embodiments of the present disclosure, the network-side device pages the second SIM only when initiating a target-type service for the second SIM, and does not need to page the second SIM when initiating other types of services for the second SIM. In this way, the paging for the second SIM is reduced during the communication process of the first SIM, which is conducive to conserving the resources of the network-side device, and also is conducive to avoiding affecting the terminal communication process using the first SIM.

In one embodiment, the network-side device communicating with the first SIM and the network-side device paging the second SIM may be the same network-side device or different network-side devices. For example, if the first SIM is communicating with the base station A, and the base station B needs to page the second SIM, the base station A may forward the paging restriction information from the first SIM to the base station B.

It is to be noted that the conditions indicated by the paging restriction information are not limited to those described in the above embodiments and may be set as desired. For example, the paging restriction information is configured for indicating at least one of:

- restricting all paging; in this case, the network-side device can suspend paging the terminal;
- restricting paging for other types of services other than the target type of service; in this case, the network-side device pages the terminal only when initiating the target type of service, whereas the network-side device does not need to page the terminal when initiating other types of services; the target type of service can also be set up as required, which can be one type of service or a variety of types of services, for example, it can be a voice service;

restricting paging for sessions other than a target protocol data unit (PDU) session(s); in this case, the network-side device pages the terminal only when initiating the service corresponding to the target PDU session(s), and does not need to page the terminal when initiating the service corresponding to the other PDU session(s).

In one embodiment, the network-side device includes a base station and the paging restriction information is carried in a radio resource control (RRC) signaling.

While in the connected state, the terminal may send the paging restriction information to the base station by carrying it in a RRC signaling.

In one embodiment, the paging restriction information is carried in user equipment assistance information (UE Assistance Information) of the radio resource control signaling.

In one embodiment, the paging restriction information is carried in an added information element (IE) of the user equipment assistance information.

In one embodiment, the user equipment assistance information is further configured for indicating a RRC state that the terminal is expected to enter. The RRC state includes, but is not limited to, an idle state or an inactive state.

In one embodiment, for a multi-SIM terminal, when communicating with the network-side device through a SIM, if needing to switch to another SIM for communicating, the multi-SIM terminal may send the paging restriction information to the network-side device via the SIM being used, and the paging restriction information is configured for indicating conditions under which the network-side device restricts paging for the SIM being used.

In this case, since the terminal needs to switch to another SIM for communicating, the RRC state of the SIM being used is going to be changed from the connected state to another state. Therefore, if the paging restriction information is sent to the base station by being carried in the user equipment assistance information, the RRC state that the SIM being used is expected to enter can also be indicated by the user equipment assistance information. In this way, carrying the paging restriction information through the user equipment assistance information and indicating the RRC state that the terminal is expected to enter are realized, which is conducive to saving communication resources.

In one embodiment, the user equipment assistance information may indicate the RRC state that the terminal is expected to enter in an explicit manner, such as adding specific indication information to the user equipment assistance information to indicate the RRC state that the terminal is expected to enter; the user equipment assistance information may also indicate the RRC state that the terminal is expected to enter in an implicit manner, for example, in the case where the paging restriction information is carried in the user equipment assistance information, it is by default that the user equipment assistance information indicates that the terminal is expected to enter a target RRC state. The target RRC state may be an idle state or a non-active state.

In one embodiment, the network-side device includes a 5G core network, such as a core network in a New Radio (NR) system, where network elements of the core network are access and mobility management function (AMF), and the paging restriction information is carried in at least one of:

service request (Service Request) message or registration request (Registration Request) signaling.

In one embodiment, the network-side device includes a 4G core network, such as a core network in an evolved UMTS terrestrial radio access network (E-UTRAN) system, where network elements of the core network are mobility management entity (MME), the paging restriction information being carried in at least one of:

service request (Service Request) message, extended service request (Extended Service Request) message, tracking area update request (Tracking Area Update Request) signaling, attach request (Attach Request) signaling.

Figure 2:
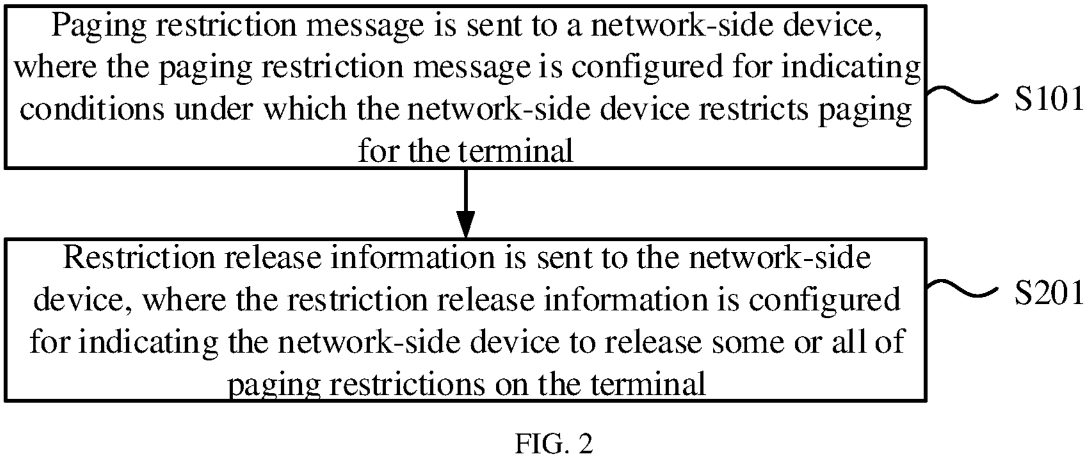
FIG. 2 is a schematic flowchart of another information sending method illustrated according to embodiments of the present disclosure.

FIG. 2 is a schematic flowchart of another sending information method illustrated according to embodiments of the present disclosure. As shown in FIG. 2, the method further includes step S201.

In step S201, restriction release information is sent to the network-side device, where the restriction release information is configured for indicating the network-side device to release some or all of paging restrictions on the terminal.

In one embodiment, the terminal may also send restriction release information to the network-side device so as to indicate the network-side device to release some or all of the paging restrictions on the terminal, thereby allowing the network-side device to change the conditions to be taken into account when needing to page the terminal.

For example, if there are a plurality of conditions of restricting paging for the terminal, the restriction release information may indicate that one or more of the plurality of conditions are invalid. For example, if one of the conditions is indicated to be invalid, then the network-side device, when needing to page the terminal, may ignore the invalid condition and determine whether to page the terminal based only on other conditions that are not invalidated; for example, if all the conditions are indicated to be invalid, then the network-side device, when needing to page the terminal, may directly page the terminal. Accordingly, the flexibility of the network-side device paging the terminal can be improved, which is conducive to meeting the needs of the terminal and the network-side device.

In one embodiment, the paging restriction information is further configured for indicating a duration (time length) for which the network-side device restricts paging for the terminal.

The network-side device may restrict paging for the terminal only within the duration based on the conditions indicated by the paging restriction information, while beyond the duration, the network-side device may directly page the terminal.

For example, if there is a plurality of conditions of restricting paging, a respective duration can be set for each corresponding condition, and the durations can be different. For example, if the paging restriction information indicates two restriction conditions, where a condition 1 corresponds to a duration T1, a condition 2 corresponds to a duration T2, $T1<T2$, and the starting points of T1 and T2 are the same, then when needing to page the terminal within the duration of T1, the network-side device can determine whether one of the conditions 1 and 2 is satisfied, and if it is satisfied, then the network-side device does not page the terminal; when needing to page the terminal after the end of T1 and before the end of T2, the network-side device can determine whether the condition 2 is satisfied, and if it is satisfied, then the network-side device does not page the terminal; after the end of T2, the network-side device can directly page the terminal when needing to page the terminal. Accordingly, the flexibility of the network-side device paging the terminal can be improved, which is conducive to meeting the needs of the terminal and the network-side device.

Figure 3:
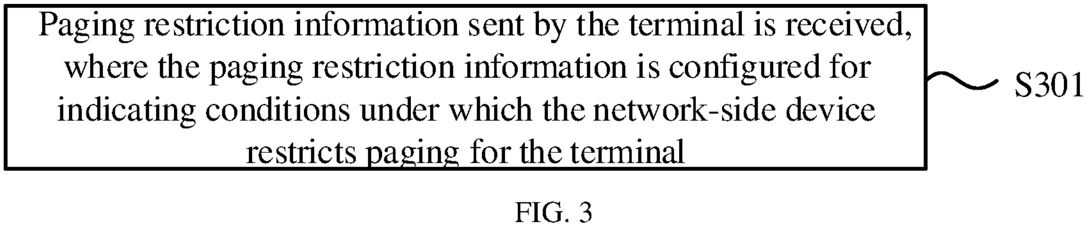
FIG. 3 is a schematic flowchart of a paging restriction method illustrated according to embodiments of the present disclosure.

FIG. 3 is a schematic flowchart of a paging restriction method illustrated according to embodiments of the present disclosure. The paging restriction method illustrated in this embodiment may be performed by a network-side device. The network-side device includes but is not limited to a base station and a core network. The base station and the core network include but are not limited to a base station and a core network in a communication system such as 4G, 5G, 6G and the like. The network-side device may communicate with a terminal as user equipment, the terminal including but not limited to a cell phone, a tablet computer, a wearable device, a sensor, an IoT device, and other communication devices.

As shown in FIG. 3, the paging restriction method may include the step S301.

In step S301, paging restriction information sent by the terminal is received, where the paging restriction information is configured for indicating conditions under which the network-side device restricts paging for the terminal.

In one embodiment, the terminal may determine its own tendency for the paging, such as allowing the reception of paging for a target type of service and disallowing the reception of paging for other types of services. Further, paging restriction information may be generated according to the paging tendency. The paging restriction information may be sent to the network-side device, so that the network-side device may determine the conditions of restricting paging for the terminal according to the paging restriction information. In this way, when requiring to page a terminal, the network-side device can determine whether or not to page the terminal according to the conditions. That is, on the basis of the embodiment illustrated in FIG. 3, the method may further include: restricting paging for the terminal according to the conditions. Thus, unnecessary paging is avoided so as to avoid wasting the resources of the network-side device and to avoid affecting the communication of the terminal.

In one embodiment, the terminal may be a single-SIM terminal or a multi-SIM terminal.

In the case where the terminal is a single-SIM terminal, a SIM (Subscriber Identity Module) is provided in the terminal, and paging restriction information may be configured for indicating conditions under which the network-side device restricts paging for this SIM.

In the case where the terminal is a multi-SIM terminal, a plurality of SIMs are provided in the terminal, and the paging restriction information may be configured for indicating conditions under which the network-side device restricts paging for at least one of the SIMS, for example, for indicating respective conditions under which the network-side device restricts paging for each corresponding SIM.

Taking a first SIM and a second SIM in the plurality of SIMs as an example. The paging restriction information may be configured for indicating a condition 1 under which the network-side device restricts paging for the first SIM and a condition 2 under which the network-side device restricts paging for the second SIM. The condition 1 and the condition 2 may be the same or may be different, as may be set as desired.

In one embodiment, for a multi-SIM terminal, when the terminal is communicating with a network-side device through a SIM, it may send paging restriction information to the network-side device via the SIM, the paging restriction information being configured for indicating conditions under which the network-side device restricts paging for other unused SIMs.

For example, still take the first SIM and the second SIM as an example. The terminal is communicating with the network-side device through the first SIM, and may send paging restriction information to the network-side device via the first SIM, the paging restriction information being configured for indicating conditions under which the network-side device restricts paging for the second SIM.

Accordingly, when needing to page the second SIM, the network-side device may first determine whether the conditions are satisfied. For example, if the conditions include a type of service to be paged for the second SIM being other types of services other than the target type of service, the network-side device may page the second SIM only when needing to initiate the target type of service for the second SIM, and does not need to page the second SIM when initiating other types of services for the second SIM.

On the one hand, the network-side device paging the second SIM consumes resources of the network-side device. On the other hand, after receiving the paging for the second SIM, the terminal also needs to determine whether to interrupt the communication of the first SIM and respond to the paging for the second SIM, which may affect the communication of the terminal.

According to embodiments of the present disclosure, the network-side device pages the second SIM only when initiating a target-type service for the second SIM, and does not need to page the second SIM when initiating other types of services for the second SIM. In this way, the paging for the second SIM is reduced during the communication process of the first SIM, which is conducive to conserving the resources of the network-side device, and also is conducive to avoiding affecting the terminal communication process using the first SIM.

In one embodiment, the network-side device communicating with the first SIM and the network-side device paging the second SIM may be the same network-side device or different network-side devices. For example, if the first SIM is communicating with the base station A, and the base station B needs to page the second SIM, the base station A may forward the paging restriction information from the first SIM to the base station B.

It is to be noted that the conditions indicated by the paging restriction information are not limited to those described in the above embodiments and may be set as desired. For example, the paging restriction information is configured for indicating at least one of:

- restricting all paging; in this case, the network-side device can suspend paging the terminal;
- restricting paging for other types of services other than the target type of service; in this case, the network-side device pages the terminal only when initiating the target type of service, whereas the network-side device does not need to page the terminal when initiating other types of services;
- restricting paging for sessions other than a target protocol data unit (PDU) session(s); in this case, the network-side device pages the terminal only when initiating the service corresponding to the target PDU session(s), and does not need to page the terminal when initiating the service corresponding to the other PDU session(s).
- restricting paging for services and/or protocol data unit sessions corresponding to other priorities lower than a target priority; in this case, when initiating paging, the network-side device may first determine the priority of the service and/or protocol data unit session corresponding to the paging, and only page the terminal if the priority is higher than the target priority; not page the terminal if the priority is lower than the target priority; and further determination may be made according to the actual situation in the case that the priority is equal to the target priority.

In one embodiment, the plurality of SIMs includes a first SIM and a second SIM, the method further including:

determining a second priority of a service and/or protocol data unit session conducted by the second SIM in response to switching from the first SIM to the second SIM; and generating the paging restriction information based on the second priority, where the paging restriction information is configured for indicating conditions under which the network-side device restricts paging for the first SIM include a priority of a service and/or protocol data unit session to be paged for the first SIM being lower than the second priority.

In one embodiment, still take the first SIM and the second SIM described above as an example. When the terminal communicates using the first SIM, if it is determined that the terminal needs to switch to the second SIM, a request to enter a non-connected state may be sent by the first SIM to the network-side device. For example, if the terminal is expected to enter an idle state, a connection release request may be sent, and if the terminal is expected to enter an inactive state, a hang-up request may be sent. The in response to switching from the first SIM to the second SIM may refer to when it is determined that switching to the second SIM is required, or when the first SIM sends the request to enter the non-connected state to the network-side device.

Further, a second priority of a service and/or protocol data unit session which the second SIM is conducting or will conduct may be determined and paging restriction information may be generated based on the second priority. The conditions indicated by the paging restriction information under which the network-side device restricts paging for the first SIM includes a priority of a service and/or protocol data unit session to be paged for the first SIM being lower than the second priority.

Accordingly, when needing to page the first SIM, the network-side device may determine a relationship between the priority of the corresponding paged service and/or protocol data unit session and the second priority. If the priority of the corresponding paged service and/or protocol data unit session is lower than the second priority, the network-side device does not need to page the first SIM; if the priority is higher than the second priority, the network-side device may page the first SIM; and if the priority is equal to the second priority, the network-side device can judge according to the actual situation, whether to page the first SIM or not page the first SIM. Accordingly, the paging for services and/or protocol data unit sessions corresponding to low priorities can be avoided, so as not to affect the communication process of the terminal using the second SIM, thereby ensuring the quality of communication when the terminal is using the second SIM.

Take priorities of services as an example. For example, a priority is set for instant messaging service, voice call service, video communication service, and game service respectively, and the set priorities are in a descending order of voice call service, game service, instant messaging service, and video communication service.

The terminal is currently communicating using the first SIM, and if it is determined that the terminal needs to switch to the second SIM, a priority of a service being performed or to be performed by the second SIM may be determined, for example, a game service. Further, paging restriction information can be generated accordingly, and the paging restriction information indicates the network-side device to restrict paging for other services that have a lower priority than the corresponding priority of the gaming service when the network-side device paging the first SIM. Then, for the above four types of services, the first SIM is paged only when the network-side device triggers paging based on the voice call service, and the first SIM is not paged when the paging is triggered based on other services. Accordingly, it is possible to avoid the communication carried out by the terminal using the second SIM being affected by the paging corresponding to the services of low priorities, which is conducive to ensuring the quality of the communication carried out by the terminal using the second SIM.

In one embodiment, the plurality of SIMs correspond to an association relationship between services and/or protocol data unit sessions and priorities, or each SIM corresponds respectively to an association relationship between services and/or protocol data unit sessions and priorities.

In one embodiment, it may be configured that the plurality of SIMs correspond to an association relationship between services and/or protocol data unit sessions and priorities. Take the association relationship between services and priorities as an example, an association relationship between services and priorities may be set such that when the terminal communicates using any one of the SIMS, the priority of the service corresponding to the communication is determined according to the association relationship.

In one embodiment, it may be configured that each of the plurality of SIMs corresponds to a respective association relationship between services and/or protocol data unit sessions and priorities. Take the association relationship between services and priorities as an example. A plurality of association relationships between services and priorities can be set, and each of the plurality of SIMs can correspond to a respective different association relationship. Therefore, when the terminal uses a SIM for communication, the association relationship corresponding to the SIM can be determined first, and the priority of the service corresponding to the communication of the SIM can be determined according to the association relationship.

For example, if the first SIM is used only for voice call communication, the association relationship between the service corresponding to the first SIM and the priority is that the priority of the voice call service is higher than priorities of other services; if the second SIM is used only for game service, the association relationship between the service corresponding to the second SIM and the priority is that the priority of the game service is higher than that of other services. Then, when the terminal is switched from the first SIM to the second SIM, the paging restriction information generated may indicate that conditions under which the network-side device restricts paging for the first SIM include a service to be paged for the first SIM being other services other than the voice call service, i.e., the first SIM is paged only in the case where paging is triggered based on the voice call service.

In one embodiment, the method further includes: sending update information of the paging restriction information to the network-side device. The terminal may update the paging restriction information as needed by sending update information of the paging restriction information to the network-side device, for example the terminal may update some or all of the restrictions indicated by the paging restriction information.

It is noted that the updating includes at least one of the following operations: newly adding a restriction condition, deleting an indicated restriction condition, or changing an indicated restriction condition. Changing the indicated restriction condition may vary based on the restriction condition, for example, if the restriction condition is directed to all paging, then changing the indicated restriction condition may refer to changing to paging for other types of services other than the target type of service; for example, if the restriction condition is a priority of a service and/or protocol data unit session to be paged being lower than the target priority, then changing the indicated restriction condition may refer to lowering the target priority.

In one embodiment, sending the update information of the paging restriction information to the network-side device includes:

sending the update information of the paging restriction information to the network-side device when at least one of the following is satisfied:

a duration of communication using the second SIM is greater than a duration threshold; or an amount of data transmitted using the second SIM is greater than a data amount threshold.

In one embodiment, after switching to the second SIM for communication, the usage of the second SIM can be monitored and based on the monitoring results, it can be determined whether to send the update information.

For example, the duration of the communication using the second SIM may be monitored. If the duration is greater than the duration threshold, which indicates that the main part of the second SIM communication may have ended in general, then the paging restriction information may be updated appropriately, for example, by lowering the target priority, so as to enable the network-side device to page the first SIM for more services in order to ensure the communication of the first SIM to a certain extent.

Similarly, the amount of data transmitted using the second SIM may be monitored. If the amount of data is greater than a data amount threshold, which indicates that the main part of the second SIM communication may have ended in general, then the paging restriction information may be updated appropriately, for example, by lowering the target priority, so that the network-side device may page the first SIM for more services in order to ensure the communication of the first SIM to a certain extent.

It is to be noted that the above monitoring operation may be performed by the second SIM or by the processor of the terminal. The operation of generating the update information may be performed by the first SIM or by the processor of the terminal.

Figure 4:
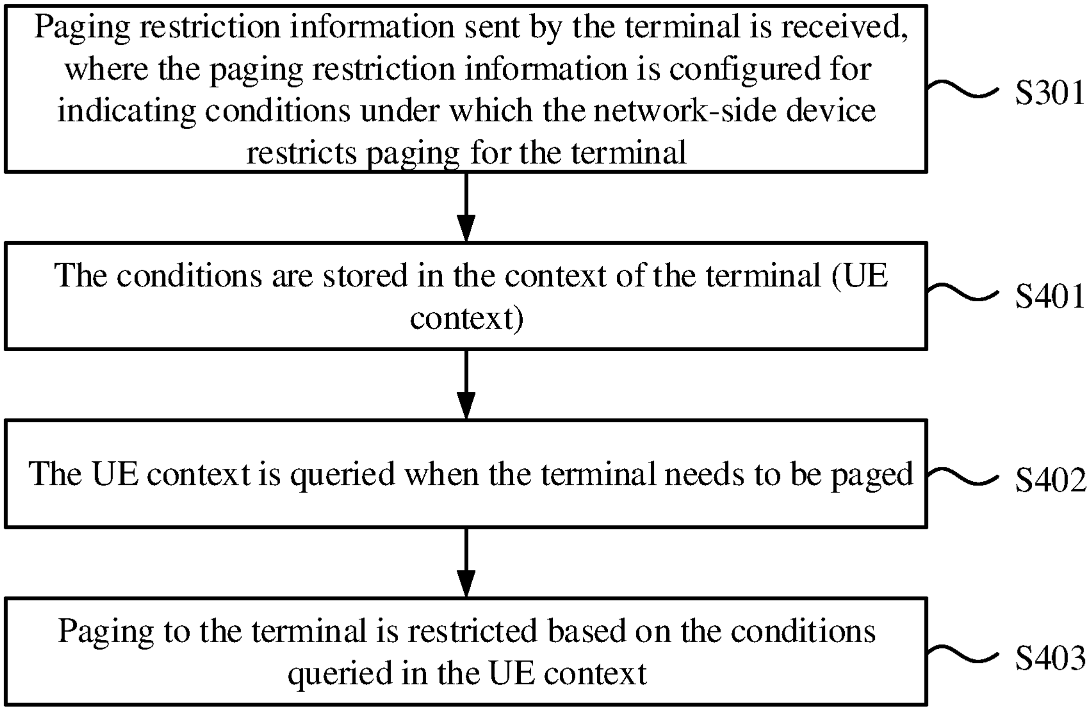
FIG. 4 is a schematic flowchart of another paging restriction method illustrated according to embodiments of the present disclosure.

FIG. 4 is a schematic flowchart of another paging restriction method illustrated according to embodiments of the present disclosure. As shown in FIG. 4, the network-side device includes a base station, and restricting paging for the terminal according to the conditions includes steps S401 to S403.

In step S401, the conditions are stored in the context of the terminal (UE context).

In step S402, the UE context is queried when the terminal needs to be paged.

In step S403, paging to the terminal is restricted based on the conditions queried in the UE context.

In one embodiment, the base station queries a UE context when the base station needs to initiate paging for the terminal. On this basis, the restriction condition indicated by the paging restriction information is set to be stored in the UE context, which can ensure that the base station can query the restriction condition in the process of querying the context when needing to page the terminal. If the restriction condition is queried, it can be determined whether to page the terminal according to the restriction condition, which is conducive to quickly determining the restriction condition; if no restriction condition is queried, the base station can page the terminal directly.

In one embodiment, the network-side device includes a base station, and receiving paging restriction information sent by a terminal includes: receiving the paging restriction information sent by a core network, where the paging restriction information is sent by the terminal to the core network. The terminal may send the paging restriction information to the core network first, and the base station may receive the paging restriction information sent by the core network.

In one embodiment, the network-side device includes a core network, restricting paging for the terminal according to the conditions including: sending the paging restriction information to the base station, indicating the base station to restrict paging for the terminal according to the conditions in the paging restriction information. The terminal may send the paging restriction information first to the core network and then the paging restriction information can be sent from the core network to the base station.

In one embodiment, the base station includes at least one:

all base stations to which the core network is connected;

a base station in a tracking area (TA) and/or routing area (RA) in which the terminal is located; or a base station to which the terminal is connected.

After receiving the paging restriction information sent by the terminal, the core network may send the paging restriction information to all base stations to which the core network is connected; the core network may also first determine the tracking area and/or the routing area in which the terminal is located, further determine the base stations in the tracking area and/or the routing area, and send the paging restriction information to the base stations; and the core network may further determine the base station to which the terminal is connected, and send the paging restriction information to the base station to which the terminal is connected.

The exact base stations to which the paging restriction information is to be sent may be determined by the core network as needed, or may be determined based on indications from the terminal, such as the paging restriction information therein indicating the base stations to which the core network needs to send the paging restriction information.

In one embodiment, the paging restriction information is sent to the base station by being carried in at least one of:

an initial context setup request (INITIAL CONTEXT SETUP REQUEST), a UE context modification request (UE CONTEXT MODIFICATION REQUEST), a network element configuration update signaling, or an interface establishment response signaling.

In one embodiment, the core network includes a 5G core network, such as a core network in an NR system, with the core network element being an AMF and the interface between the core network and the base station being an NG interface. Then the network element configuration update signaling includes an AMF update signalling (AMF CONFIGURATION UPDATE), and/or the interface setup response signaling includes a next generation (NG) interface setup response signalling (NG SETUP RESPONSE). An initial context setup request and/or a user equipment context modification request sent by the NG interface to the base station may also carry the paging restriction information.

In one embodiment, the core network includes a 4G core network, such as a core network in an E-UTRAN system, where the core network element is an MME and the interface between the core network and the base station is an S1 interface. The network element configuration update signaling includes MME update signaling (MME CONFIGURATION UPDATE), and/or the interface establishment response signaling includes S1 interface setup response signalling (S1 SETUP RESPONSE). The paging restriction information may also be carried in an initial context establishment request and/or a UE context modification request sent to the base station via the S1 interface.

Figure 5:
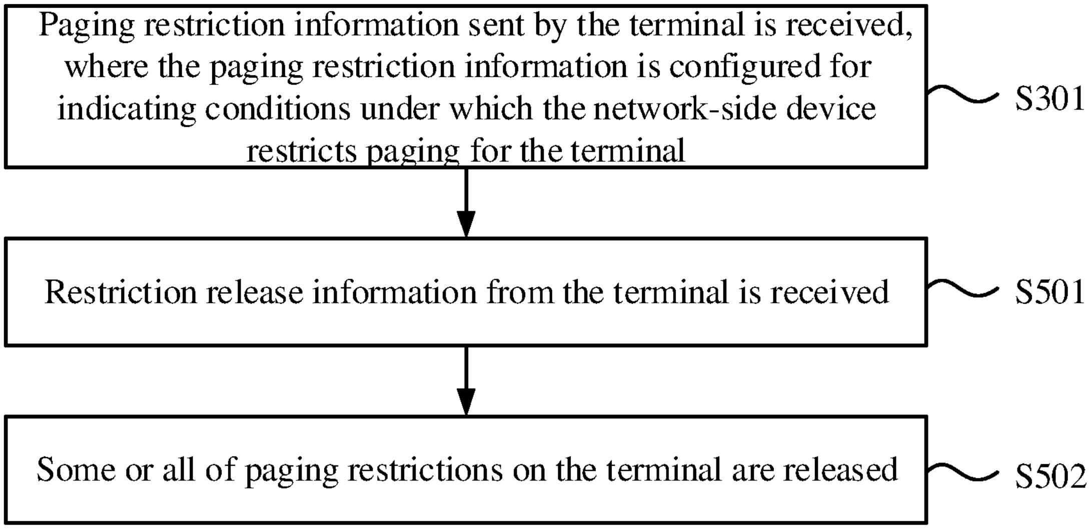
FIG. 5 is a schematic flowchart of yet another paging restriction method illustrated according to embodiments of the present disclosure.

FIG. 5 is a schematic flowchart of yet another paging restriction method illustrated according to embodiments of the present disclosure. As shown in FIG. 5, the method further includes steps S501 to S502.

In step S501, restriction release information from the terminal is received.

In step S502, some or all of paging restrictions on the terminal are released.

In one embodiment, the terminal may also send restriction release information to the network-side device to indicate the network-side device to release some or all of the paging restrictions on the terminal, thereby allowing the network-side device to change the conditions to be taken into account when the terminal needs to be paged.

For example, if there are multiple conditions for restricting paging for the terminal, the restriction release information may indicate that one or more of these multiple conditions are invalid. For example, if one of the conditions is indicated to be invalid, then the network-side device, when needing to page the terminal, may ignore the invalid condition and determine whether to page the terminal based only on other conditions that are not invalidated; for example, if all the conditions are indicated to be invalid, then the network-side device, when needing to page the terminal, may directly page the terminal. Accordingly, the flexibility of the network-side device paging the terminal can be improved, which is conducive to meeting the needs of the terminal and the network-side device.

Figure 6:
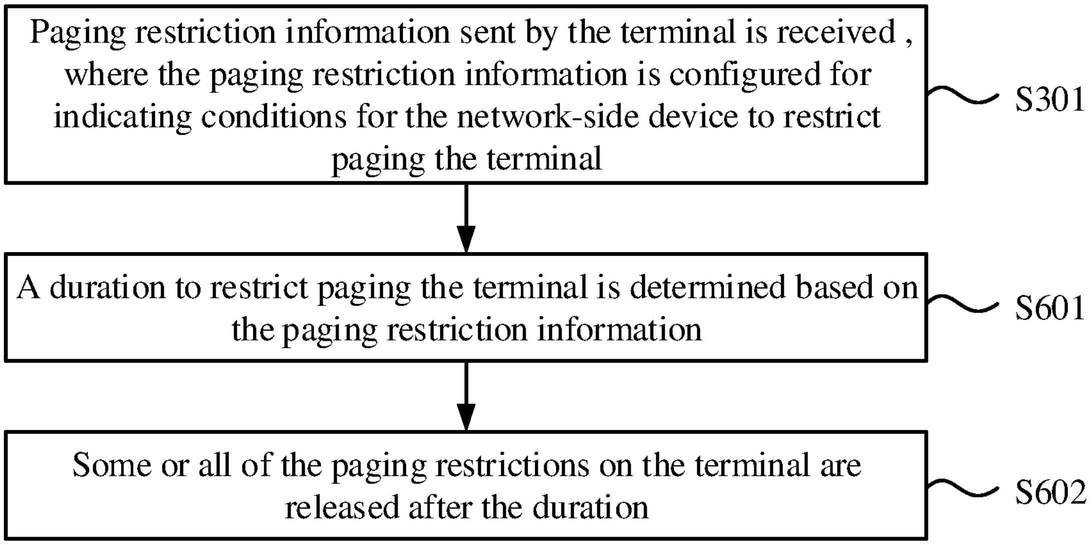
FIG. 6 is a schematic flowchart of yet another paging restriction method illustrated according to embodiments of the present disclosure.

FIG. 6 is a schematic flowchart of yet another paging restriction method illustrated in accordance with embodiments of the present disclosure. As shown in FIG. 6, the method further includes steps S601 to S602.

In step S601, a duration to restrict paging the terminal is determined based on the paging restriction information;

In step S602, some or all of the paging restrictions on the terminal are released after the duration.

In one embodiment, the paging restriction information is further configured for indicating a duration for which the network-side device restricts paging for the terminal.

The network-side device may restrict paging for the terminal only within that duration, based on the conditions indicated by the paging restriction information, while beyond that duration, it may directly page the terminal.

For example, if there is a plurality of conditions of restricting paging, a respective duration can be set for each corresponding condition, and the durations can be different. For example, if the paging restriction information indicates two restriction conditions, where a condition 1 corresponds to a duration T1, a condition 2 corresponds to a duration T2, T1<T2, and the starting points of T1 and T2 are the same, then when the network-side device needs to page the terminal within the duration of T1, it can determine whether one of the conditions 1 and 2 is satisfied, and if it is satisfied, then it does not page the terminal; when it needs to page the terminal after the end of T1 and before the end of T2, it can determine whether the condition 2 is satisfied, and if it is satisfied, then it does not page the terminal; after the end of T2, it can directly page the terminal when needing to page the terminal. Accordingly, the flexibility of the network-side device in paging the terminal can be improved, which is conducive to meeting the needs of the terminal and the network-side device.

According to embodiments of the present disclosure, the terminal may send the paging restriction information to the network-side device, so that the network-side device may determine the conditions for restricting the paging terminal based on the paging restriction information, and then when the terminal is needed to be paged, the terminal may be determined to be paged or not based on the conditions, so that unnecessary paging may be avoided, so as to avoid wasting the resources of the network-side device and avoiding any impact on the communication of the terminal.

In addition, for the multi-SIM terminal, the network-side device may page the second SIM only when initiating the target type of service for the second SIM, and does not have to page the second SIM when initiating other types of services for the second SIM, thereby reducing the paging of the second SIM during the communication process of the first SIM, which is conducive to conserving the resources of the network-side device, and also is conducive to avoiding affecting the communication process in which the terminal is using the first SIM.

Corresponding to the foregoing embodiments of the information sending method and the paging restriction method, the present disclosure also provides embodiments of the information sending apparatus and the paging restriction apparatus.

Embodiments of the present disclosure also propose an information sending apparatus, the apparatus may be applied to a terminal, the terminal including but not limited to a cell phone, a tablet computer, a wearable device, a sensor, an Internet of Things device, and other communication devices. The terminal may be used as user equipment to communicate with a network-side device. The network-side device includes but is not limited to a base station, and a core network, and the base station and the core network include but are not limited to a base station, and a core network in a communication system such as 4G, 5G, 6G and the like.

In one embodiment, the apparatus includes one or more processors, the processors being configured to perform sending paging restriction information to a network-side device, wherein the paging restriction information is configured for indicating conditions under which the network-side device restricts paging for the terminal.

In one embodiment, the paging restriction information is configured for indicating at least one of: restricting all paging; restricting paging for other types of services other than a target type of service; restricting paging for sessions other than a target protocol data unit session; restricting paging for services and/or protocol data unit sessions corresponding to other priorities lower than a target priority.

In one embodiment, the terminal is equipped with a plurality of SIMs, and the paging restriction information is configured for indicating conditions under which the network-side device restricts paging for at least one of the SIMs.

In one embodiment, the plurality of SIMs include a first SIM and a second SIM, and the processor is further configured to: determine a second priority of a service and/or protocol data unit session conducted by the second SIM in response to switching from the first SIM to the second SIM;

generate the paging restriction information based on the second priority, where the conditions indicated by the paging restriction information under which the network-side device restricts paging for the first SIM include a priority of a service and/or protocol data unit session to be paged for the first SIM being lower than the second priority.

In one embodiment, the plurality of SIMs correspond to an association relationship between services and/or protocol data unit sessions and priorities, or each of the plurality of SIMs corresponds to a respective association relationship between services and/or protocol data unit sessions and priorities.

In one embodiment, the processor is further configured to send update information of the paging restriction information to the network-side device.

In one embodiment, the processor is configured to send the update information of the paging restriction information to the network-side device in response to meeting at least one of:

a duration of communication using the second SIM is greater than a duration threshold; or an amount of data transmitted using the second SIM is greater than a data amount threshold.

In one embodiment, the network-side device includes at least one of: a base station or a core network.

In one embodiment, the network-side device includes a base station and the paging restriction information is carried in a radio resource control signaling.

In one embodiment, the paging restriction information is carried in user equipment assistance information of the radio resource control signaling.

In one embodiment, the paging restriction information is carried in a newly added information element of the user equipment assistance information.

In one embodiment, the user equipment assistance information is further configured for indicating a radio resource control state that the terminal is expected to enter.

In one embodiment, the user equipment assistance information indicates, in an explicit and/or implicit way, a radio resource control state that the terminal is expected to enter.

In one embodiment, the network-side device includes a 5G core network, and the paging restriction information is carried in at least one of: a service request message or a registration request signaling.

In one embodiment, the network-side device includes a 4G core network, and the paging restriction information is carried in at least one of:

a service request message, an extended service request message, a tracking area update request signaling, or an attach request signaling.

In one embodiment, the processor is further configured to perform sending restriction release information to the network-side device, where the restriction release information is configured for indicating the network-side device to release some or all of paging restrictions on the terminal.

In one embodiment, the paging restriction information is further configured for indicating a duration for which the network-side device restricts paging for the terminal.

Embodiments of the present disclosure also propose a paging restriction apparatus that can be applied to a network-side device, the network-side device including, but not limited to, a base station or a core network. The base station or a core network including, but not limited to, a base station or a core network in a communication system such as 4G, 5G, 6G, and the like. The network-side device may communicate with a terminal as user equipment, the terminal including but not limited to a cell phone, a tablet computer, a wearable device, a sensor, an Internet of Things device and other communication devices.

In one embodiment, the apparatus includes one or more processors, the processors being configured to perform receiving paging restriction information sent by a terminal, where the paging restriction information is configured for indicating conditions under which the network-side device restricts paging for the terminal.

In one embodiment, the processor is further configured to perform restricting paging for the terminal according to the conditions.

In one embodiment, the network-side device includes at least one of: a base station or a core network.

In one embodiment, the network-side device includes a base station, the processor being configured to perform storing the conditions in context of the terminal; querying the context of the terminal when the terminal needs to be paged; and restricting the paging for the terminal based on the conditions queried in the context of the terminal.

In one embodiment, the network-side device includes a base station, the processor being configured to perform receiving the paging restriction information sent by a core network, where the paging restriction information is sent to the core network by the terminal.

In one embodiment, the network-side device includes a core network, the processor being configured to perform sending the paging restriction information to a base station to indicate the base station to restrict the paging for the terminal according to the conditions in the paging restriction information.

In one embodiment, the base stations include at least one of: all base stations to which the core network is connected; base stations in a tracking area and/or routing area in which the terminal is located; or a base station to which the terminal is connected.

In one embodiment, the paging restriction information is sent to the base station by being carried in at least one of: an initial context setup request, a user equipment context modification request, a network element configuration update signaling, or an interface establishment response signaling.

In one embodiment, the core network includes a 5G core network, and the network element configuration update signaling includes an access and mobility management function update signaling, and/or the interface establishment response signaling comprises a NG interface setup response signaling.

In one embodiment, the core network includes a 4G core network, and the network element configuration update signaling includes a mobility management entity update signaling, and/or the interface establishment response signaling includes a S1 interface setup response signaling.

In one embodiment, the processor is further configured to perform receiving restriction release information sent by the terminal; and releasing some or all of paging restrictions on the terminal.

In one embodiment, the processor is further configured to perform: determining a duration for restricting paging for the terminal based on the paging restriction information; and releasing some or all of paging restrictions on the terminal after the duration.

With respect to the apparatus in the above embodiment, the specific manner in which each module performs an operation has been described in detail in the embodiment of the relevant method, and will not be described in detail herein.

For the apparatus embodiment, since it corresponds essentially to the method embodiment, it is sufficient to refer to a part of the description of the method embodiment where relevant. The above-described apparatus embodiments are merely schematic, where the modules described as illustrated as separate components may or may not be physically separated, and the components shown as modules may or may not be physical modules, i.e., they may be located in one place or may be distributed to a plurality of network modules. Some or all of these modules may be selected to fulfill the purpose of the embodiment scheme according to actual needs. It can be understood and implemented by a person of ordinary skill in the art without creative efforts.

Embodiments of the present disclosure further propose a communication apparatus including: a processor; a storage for storing computer programs; where, when the computer programs, when executed by the processor, the sending information method as described in any of the above embodiments is implemented.

Embodiments of the present disclosure also propose a communication apparatus including: a processor; a storage for storing computer programs; where, the computer programs, when executed by the processor, the paging restriction method described in any of the above embodiments is implemented.

Embodiments of the present disclosure further propose a computer-readable storage medium for storing computer programs, where when executed by a processor, the computer programs implement the steps in the information sending method described in any of the above embodiments.

Embodiments of the present disclosure also propose a computer-readable storage medium for storing computer programs, where when executed by a processor, the computer programs implement the steps in the paging restriction method described in any of the above embodiments.

Figure 7:
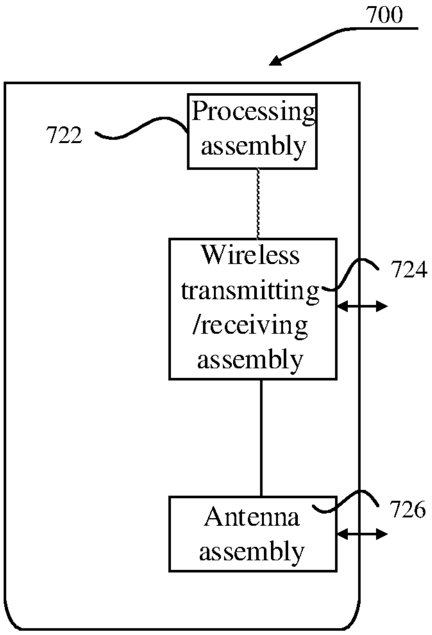
FIG. 7 is a schematic block diagram of an information sending apparatus illustrated according to embodiments of the present disclosure.

As shown in FIG. 7, FIG. 7 is a schematic block diagram of a paging restriction apparatus 700, illustrated in accordance with embodiments of the present disclosure. The apparatus 700 may be provided as a base station. Referring to FIG. 7, the apparatus 700 includes a processing assembly 722, a wireless transmitting/receiving assembly 724, an antenna assembly 726, and a signal processing portion specific to the wireless interface, and the processing assembly 722 may further include one or more processors. One of the processors in the processing component 722 may be configured to implement the paging restriction method described in any of the above embodiments.

Figure 8:
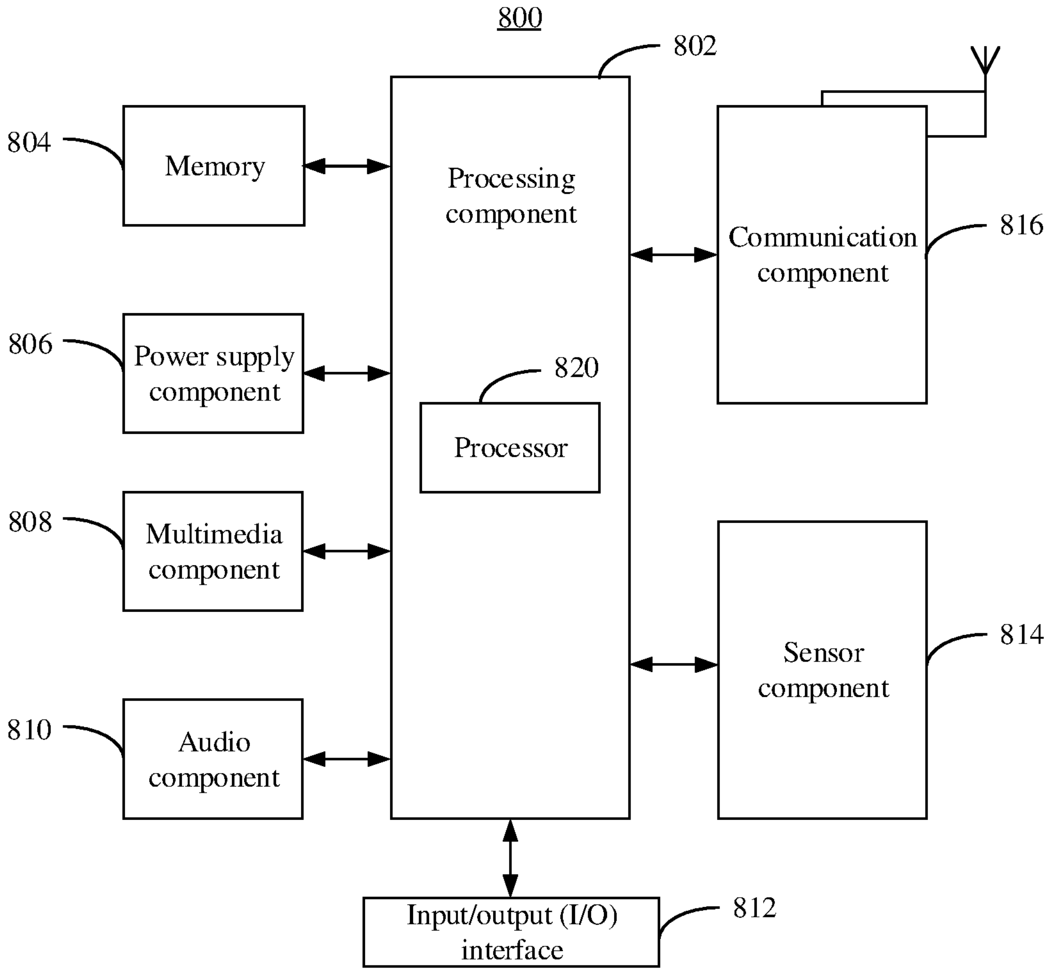
FIG. 8 is a schematic block diagram of a paging restriction apparatus illustrated in accordance with embodiments of the present disclosure.

FIG. 8 is a schematic block diagram of an information sending apparatus 800, illustrated in accordance with embodiments of the present disclosure. For example, the apparatus 800 may be a cell phone, a computer, a digital broadcast terminal, an information transceiver device, a game console, a tablet device, a medical device, a fitness device, a personal digital assistant, and the like.

Referring to FIG. 8, the apparatus 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operation of the apparatus 800, such as operations associated with display, telephone calling, data communication, camera operation, and recording operations. The processing component 802 may include one or more processors 820 to execute instructions to accomplish all or some of the steps of the information sending method described above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation at the apparatus 800. Examples of such data include instructions for any application or method operating on the apparatus 800, contact data, phone book data, messages, pictures, videos, etc. The memory 804 may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, Disks or CD-ROMs.

The power supply assembly 806 provides power to various components of the apparatus 800. The power supply assembly 806 may include a power management system, one or more power sources, and other components associated with generating, managing, and distributing power for the apparatus 800.

The multimedia component 808 includes a screen providing an output interface between the apparatus 800 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes and gestures on the touch panel. The touch sensors may not only sense the boundaries of a touch or swipe action, but also detect the duration and pressure associated with the touch or swipe operation. In some embodiments, the multimedia component 808 includes a front camera and/or a rear camera. The front camera and/or the rear camera may receive external multimedia data when the apparatus 800 is in an operational mode, such as a shooting mode or a video mode. Each front camera and rear camera may be a fixed optical lens system or have a focal length and optical zoom capability.

The audio component 810 is configured to output and/or input audio signals. For example, the audio component 810 includes a microphone (MIC) that is configured to receive external audio signals when the apparatus 800 is in an operational mode, such as a call mode, a recording mode, and a voice recognition mode. The received audio signals may be further stored in memory 804 or sent via communication component 816. In some embodiments, the audio component 810 further includes a speaker for outputting audio signals.

The I/O interface 812 provides an interface between the processing component 802 and a peripheral interface module, the peripheral interface module may be a keypad, a click wheel, a button, and the like. These buttons may include, but are not limited to: a home button, a volume button, a start button, and a lock button.

The sensor assembly 814 includes one or more sensors for providing an assessment of various aspects of the status of the apparatus 800. For example, the sensor assembly 814 may detect an open/closed state of the apparatus 800, the relative positioning of components, such as the components being the display and keypad of the apparatus 800, and the sensor assembly 814 may also detect a change in the position of the apparatus 800 or of a component of the apparatus 800, the presence or absence of user contact with the apparatus 800, the apparatus 800 orientation or acceleration/deceleration of the apparatus 800, and a change in temperature of the apparatus 800. The sensor assembly 814 may include a proximity sensor configured to detect the presence of a nearby object in the absence of any physical contact. The sensor assembly 814 may also include a light sensor, such as a CMOS or CCD image sensor, for use in imaging applications. In some embodiments, the sensor assembly 814 may also include an acceleration sensor, a gyroscope sensor, a magnetic sensor, a pressure sensor, or a temperature sensor.

The communication component 816 is configured to facilitate communication between the apparatus 800 and other devices by wired or wireless means. The apparatus 800 may access a wireless network based on a communication standard, such as WiFi, 2G or 3G, 4G LTE, 5G NR, or a combination thereof. In an exemplary embodiment, the communication component 816 receives broadcast signals or broadcast-related information from an external broadcast management system via a broadcast channel. In an exemplary embodiment, the communication component 816 further includes a near field communication (NFC) module to facilitate short range communication. For example, the NFC module may be implemented based on Radio Frequency Identification (RFID) technology, Infrared Data Association (IrDA) technology, Ultra Wide Band (UWB) technology, Bluetooth (BT) technology and other technologies.

In exemplary embodiments, the apparatus 800 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for executing the above described sending information method.

In exemplary embodiments, there is also provided a non-transitory computer-readable storage medium including instructions, such as a memory 804 including instructions, the instructions being executable by a processor 820 of the apparatus 800 to accomplish the information sending method. For example, the non-transitory computer readable storage medium may be a ROM, random access memory (RAM), CD-ROM, magnetic tape, floppy disk, and optical data storage device, among others.

Other embodiments of the present disclosure will readily come to mind to those skilled in the art upon consideration of the specification and practice of the disclosure disclosed herein. The present disclosure is intended to cover any variations, uses, or adaptations of the present disclosure that follow the general principles of the present disclosure and include common knowledge or customary technical means in the art not disclosed herein. The specification and embodiments are to be regarded as exemplary only, and the true scope and spirit of the present disclosure is indicated by the following claims.

It is to be understood that the present disclosure is not limited to the precise structure that has been described above and illustrated in the accompanying drawings, and that various modifications and changes may be made without departing from its scope. The scope of the present disclosure is limited only by the appended claims.

It should be noted that, in this document, relational terms such as first and second are used only to distinguish one entity or operation from another, and do not necessarily require or imply the existence of any such actual relationship or order between those entities or operations. The terms "including", "comprising", or any other variant thereof, are intended to cover non-exclusive inclusion, so that a process, method, article or apparatus comprising a set of elements includes not only those elements, but also other elements that are not expressly enumerated, or elements that are inherent to such process, method, article or apparatus. Without further restriction, an element defined by the phrase "includes a . . . " does not preclude the existence of another identical element in the process, method, article or apparatus that includes the element.

The above detailed description of the methods and devices provided by the embodiments of the present disclosure is provided herein, and specific examples are applied herein to illustrate the principles and implementations of the present disclosure, and the above illustrations of the embodiments are only for assist in the understanding of the methods of the present disclosure and its core ideas; at the same time, for the person of ordinary skill in the field, based on the ideas of the present disclosure, there will be changes in the specific implementations and the scope of the application. In summary, the contents of this specification should not be construed as a restriction of the present disclosure.

The invention claimed is:

1. An information sending method performed by a terminal, the method comprising:

sending paging restriction information to a network-side device, wherein the paging restriction information is configured for indicating conditions under which the network-side device restricts paging for the terminal-;

wherein the terminal is equipped with a plurality of subscriber identity modules (SIMs), and the paging restriction information is configured for indicating conditions under which the network-side device restricts paging for at least one of the plurality of SIMS;

wherein the plurality of SIMs comprise a first SIM and a second SIM, the method further comprising:

determining a priority of a service and/or protocol data unit session conducted by the second SIM in response to switching from the first SIM to the second SIM; and generating the paging restriction information based on the priority, wherein the conditions indicated by the paging restriction information under which the network-side device restricts paging for the first SIM include another priority of a service and/or protocol data unit session to be paged for the first SIM being lower than the priority.

2. The information sending method according to claim 1, wherein the paging restriction information is configured for indicating at least one of:

restricting all paging;

restricting paging for other types of services other than a target type of service;

restricting paging for sessions other than a target protocol data unit session; or restricting paging for services and/or protocol data unit sessions corresponding to other priorities lower than a target priority.

3. The information sending method according to claim 1, wherein the plurality of SIMs correspond to an association relationship between services and/or protocol data unit sessions and priorities, or each of the plurality of SIMs corresponds to a respective association relationship between services and/or protocol data unit sessions and priorities.

4. The information sending method according to claim 1, further comprising:

sending update information of the paging restriction information to the network-side device in response to meeting at least one of:

a duration of communication using the second SIM is greater than a duration threshold; or an amount of data transmitted using the second SIM is greater than a data amount threshold.

5. The information sending method according to claim 1, wherein the network-side device comprises a base station and the paging restriction information is carried in a radio resource control signaling; or the paging restriction information is carried in user equipment assistance information of the radio resource control signaling; or the paging restriction information is carried in a newly added information element of the user equipment assistance information.

6. The information sending method according to claim 1, wherein the network-side device comprises a fifth generation (5G) core network, the paging restriction information being carried in at least one of:

a service request message or a registration request signaling; or wherein the network-side device comprises a fourth generation (4G) core network, the paging restriction information being carried in at least one of:

a service request message, an extended service request message, a tracking area update request signaling, or an attach request signaling.

7. The information sending method according to claim 1, further comprising:

sending restriction release information to the network-side device, wherein the restriction release information is configured for indicating the network-side device to release some or all of a plurality of paging restrictions on the terminal.

8. The information sending method according to claim 1, wherein the paging restriction information is further configured for indicating a duration for which the network-side device restricts paging for the terminal.

9. A paging restriction method performed by a network-side device, the method comprising:

receiving paging restriction information sent by a terminal, wherein the paging restriction information is configured for indicating conditions under which the network-side device restricts paging for the terminal;

wherein in a case that the terminal is equipped with a plurality of subscriber identity modules (SIMs), the paging restriction information is configured for indicating conditions under which the network-side device restricts paging for at least one of the plurality of SIMS;

wherein the plurality of SIMs comprise a first SIM and a second SIM, and the conditions indicated by the paging restriction information under which the network-side device restricts paging for the first SIM include a first priority of a service and/or protocol data unit session to be paged for the first SIM being lower than a second priority, the second priority being associated with a service and/or protocol data unit session conducted by the second SIM, determined by the terminal in response to switching from the first SIM to the second SIM.

10. The paging restriction method according to claim 9, wherein the network-side device comprises a base station, and the method further comprises:

storing the conditions in context of the terminal;

querying the context of the terminal in response to needing to page the terminal; and restricting the paging for the terminal based on the conditions queried in the context of the terminal.

11. The paging restriction method according to claim 9, wherein the network-side device comprises a base station, and receiving the paging restriction information sent by the terminal comprises:

receiving the paging restriction information sent by a core network, wherein the paging restriction information is sent to the core network by the terminal.

12. The paging restriction method according to claim 9, wherein the network-side device comprises a core network, and the method comprises:

sending the paging restriction information to a base station to indicate the base station to restrict the paging for the terminal according to the conditions in the paging restriction information.

13. The paging restriction method according to claim 12, wherein the base station comprises at least one of:

all base stations to which the core network is connected;

base stations in a tracking area and/or routing area in which the terminal is located; or a base station to which the terminal is connected.

14. The paging restriction method according to claim 13, wherein the paging restriction information is sent to the base station by being carried in at least one of:

an initial context setup request, a user equipment context modification request, a network element configuration update signaling, or an interface establishment response signaling.

15. The paging restriction method according to claim 14, wherein the core network comprises a fifth generation (5G) core network, the network element configuration update signaling comprises an access and mobility management function update signaling, and/or the interface establishment response signaling comprises a next generation (NG) interface setup response signaling; or wherein the core network comprises a fourth generation (4G) core network, the network element configuration update signaling comprises a mobility management entity update signaling, and/or the interface establishment response signaling comprises a S1 interface setup response signaling.

16. The paging restriction method according to claim 9, further comprising:

receiving restriction release information sent by the terminal; and releasing some or all of a plurality of paging restrictions on the terminal; or determining a duration for restricting paging for the terminal based on the paging restriction information; and releasing some or all of a plurality of paging restrictions on the terminal after the duration.

17. A communication apparatus, comprising:

a processor; and a storage for storing computer programs;

wherein the processor is configured to:

send paging restriction information to a network-side device, wherein the paging restriction information is configured for indicating conditions under which the network-side device restricts paging for a terminal;

wherein the terminal is equipped with a plurality of subscriber identity modules (SIMs), and the paging restriction information is configured for indicating conditions under which the network-side device restricts paging for at least one of the plurality of SIMS;

wherein the plurality of SIMs comprise a first SIM and a second SIM, the processor is further configured to:

determine a second priority of a service and/or protocol data unit session conducted by the second SIM in response to the terminal switching from the first SIM to the second SIM; and generate the paging restriction information based on the second priority, wherein the conditions indicated by the paging restriction information under which the network-side device restricts paging for the first SIM include a priority of a service and/or protocol data unit session to be paged for the first SIM being lower than the second priority.

18. A communication apparatus, comprising:

a processor; and a storage for storing computer programs;

wherein the processor is configured to perform the method of claim 9.

* * * * *